Oct. 31, 1950
S. B. HASELTINE
2,527,675
FRICTION SHOCK ABSORBING MECHANISM FOR RAILWAY DRAFT RIGGINGS
Filed Oct. 30, 1946
2 Sheets-Sheet 1
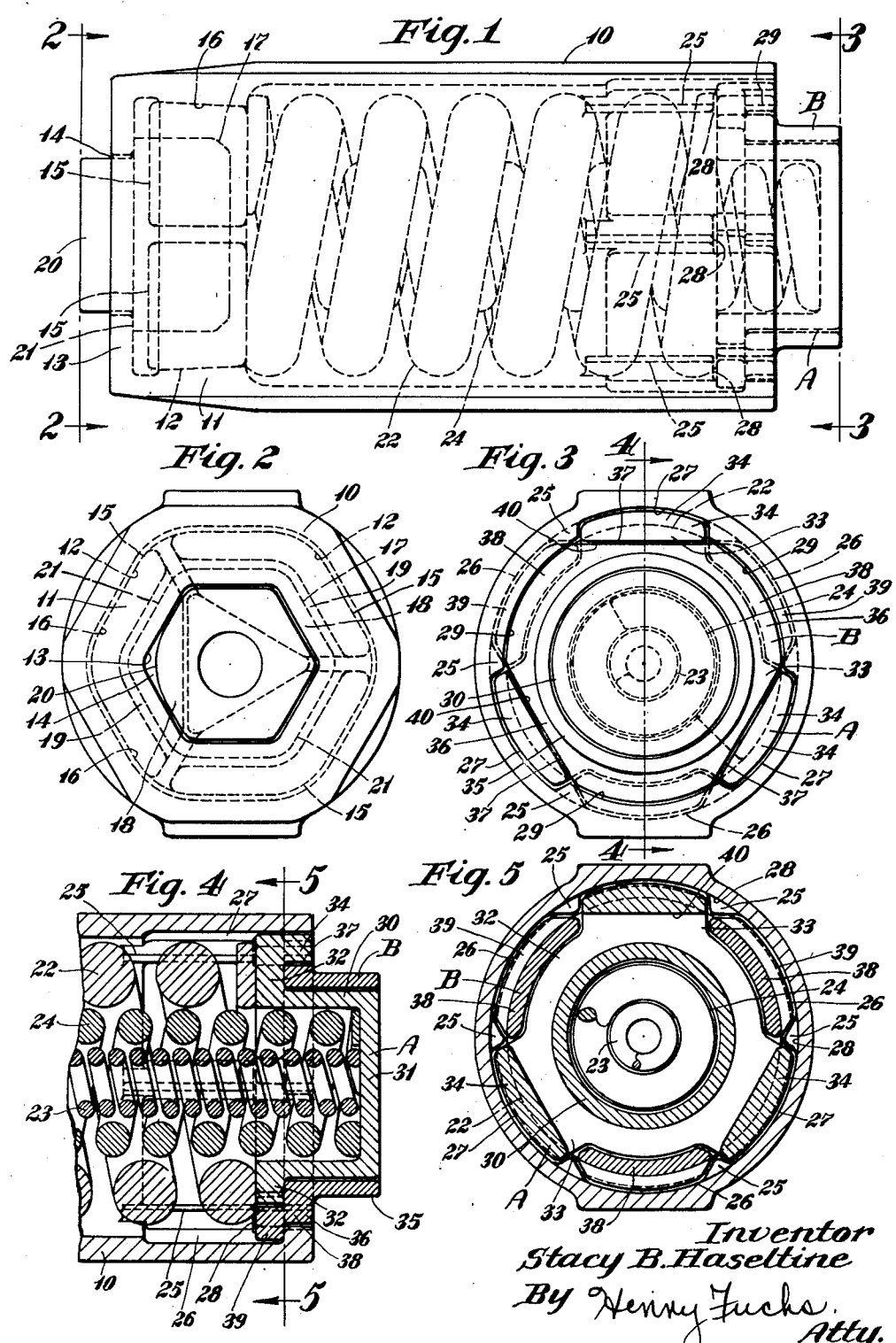
Inventor
Stacy B. Haseltine
By Henry Fuchs.
Atty.

Oct. 31, 1950 S. B. HASELTINE 2,527,675
FRICTION SHOCK ABSORBING MECHANISM
FOR RAILWAY DRAFT RIGGINGS
Filed Oct. 30, 1946 2 Sheets-Sheet 2
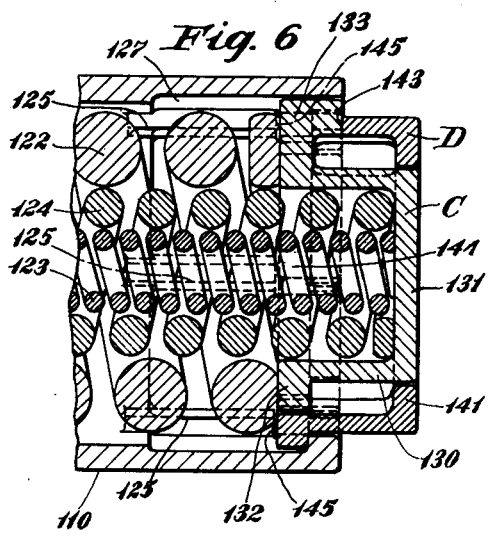
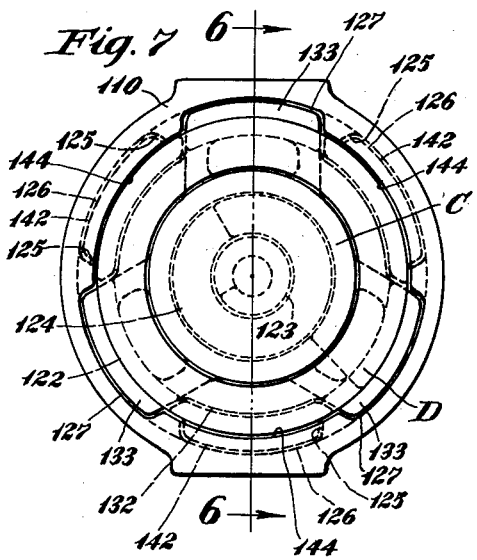
Inventor
Stacy B. Haseltine
By Henry Fuchs
Atty.

Patented Oct. 31, 1950

2,527,675

UNITED STATES PATENT OFFICE 2,527,675

FRICTION SHOCK ABSORBING MECHANISM FOR RAILWAY DRAFT RIGGINGS

Stacy B. Haseltine, La Grange, Ill., assignor to W. H. Miner, Inc., Chicago, Ill., a corporation of Delaware Application October 30, 1946, Serial No. 706,695

4 Claims. (Cl. 213—34)

1

This invention relates to improvements in friction shock absorbing mechanisms for railway draft riggings, and more particularly to mechanisms of this character employing a friction casing having a friction clutch slidingly telescoped therein, a spring for expanding the clutch, opposing movement of the same inwardly of the casing, and a movable spring cap cooperating with the spring to provide for preliminary light action.

One object of the invention is to provide in a mechanism of the character indicated a spring cap which may be readily applied to and easily removed from the casing, and a locking element having shouldered engagement with the casing and cap to limit outward movement of the cap and maintain the latter assembled with the casing.

A more specific object of the invention is to provide a mechanism as set forth in the preceding paragraph wherein the locking element and casing have shouldered engagment with each other to limit outward movement of the locking element and the shoulders are brought into operative cooperative relation by rotation of said cap with respect to the casing, and wherein the cap is restricted to movement in a direction lengthwise of the casing and has interlocking engagement with the locking element to hold the latter against rotation and thereby prevent accidental disengagement of the shoulders thereof from the cooperating shoulders of the casing.

A still further object of the invention is to provide a preliminary spring cap and cooperating locking element of the character hereinbefore specified which are held interlocked against rotation by the pressure exerted by the spring of the friction shock absorbing mechanism acting on the spring cap in projecting the same outwardly against the locking element.

Another object of the invention is to provide a friction shock absorbing mechanism having preliminary spring action comprising a friction casing, a friction clutch telescoped within one end of the casing, a spring cap slidingly telescoped within the other end of the casing, a spring within the casing yieldingly opposing inward movement of the clutch and cap, a retaining element movable lengthwise of the casing having stop lugs engageable with lugs on the casing to restrict outward movement of the retaining element, wherein the retaining element is turnable with respect to the casing to position the lugs thereof to engage the lugs of the casing, and the cap has its outward movement limited by

2 engagement with the retaining element and holds the retaining element against rotation with respect to the casing by interengaging guide means on the casing and cap restricting the latter to movement lengthwise of the casing, and projecting arms on the cap interlocked with the retaining element, and wherein the cap is held in interlocked relation with respect to the retaining element by the pressure exerted thereon by the spring of the shock absorbing mechanism and may be displaced with respect to said locking element inwardly of the casing against the resistance of the spring to provide for disengagement of the arms of the cap from the retaining element, thereby permitting the retaining element to be turned to allow either application or removal thereof and of the cap in assembling and disassembling the mechanism.

Other objects of the invention will more clearly appear from the description and claims hereinafter following.

In the accompanying drawings forming a part of this specification, Figure 1 is a side elevational view of a friction shock absorbing mechanism embodying my improvements. Figure 2 is a front elevational view of Figure 1, looking toward the right, as indicated by the arrows 2—2. Figure 3 is a rear elevational view of Figure 1, looking toward the left, as indicated by the arrows 3—3. Figure 4 is a longitudinal, vertical sectional view, corresponding substantially to the line 4—4 of Figure 3 of the rear end portion of the mechanism. Figure 5 is a transverse, vertical sectional view, corresponding substantially to the line 5—5 of Figure 4. Figure 6 is a view, similar to Figure 4, illustrating another embodiment of the invention and corresponding substantially to the line 6—6 of Figure 7. Figure 7 is a rear end elevational view of Figure 6.

Referring to Figures 1 to 5 inclusive of the drawings, the friction shock absorbing mechanism illustrated comprises a tubular casing 10 open at its front and rear ends. The main body portion of the casing is of substantially cylindrical cross section. At the forward end of the casing, the walls thereof are inwardly thickened to provide a friction shell section 11. The section 11 is of substantially hexagonal, interior and exterior cross section and presents three rearwardly and inwardly converging friction surfaces 12—12—12 of V-shaped, transverse cross section, each surface 12 being formed by two adjacent wall portions of the hexagonal section of the casing. At the forward end, beyond the friction surfaces 12, the casing has a continuous inturned flange 13, defining an opening 14 of hexagonal outline. Three friction shoes 15—15—15, which are arranged symmetrically about the longitudinal central axis of the mechanism have sliding movement within the friction shell section 11 of the casing, each shoe having a friction surface 16 of V-shaped, transverse cross section on the outer side thereof engaging the corresponding V-shaped friction surface of the shell. A central wedge block 17 has wedging engagement with the shoes 15—15—15, the block and shoes being provided with cooperating V-shaped wedge faces 18 and 19. The wedge block 17 is reduced in size at its forward end, thereby providing an extension 20 and a shoulder 21 at the inner end of the extension. The extension 20 is of generally hexagonal, transverse cross section and projects through the opening 14 and is freely slidable in said opening. The shoulder 21 is continuous around the wedge block and engages in back of the flange 13 of the casing to limit outward movement of the wedge block.

The casing 10 houses three coil springs, a heavy outer coil 22, a light central coil 23, and an intermediate coil 24 which is heavier than the coil 23 but lighter than the coil 22. The coil springs 22 and 24 have their front ends bearing on the inner ends of the shoes 15—15—15, and the light inner coil 23 has its front end bearing on the inner end of the wedge block 17.

My improvements, as shown in Figures 1 to 5 inclusive, involve broadly a spring cap A at the rear end of the casing 10, and a retaining or locking element B having shouldered engagement with the casing and cap to limit outward movement of the latter, the cap and casing having cooperating guide means for restricting the cap to movement lengthwise of the casing, and the cap and locking element having interlocking means to hold the locking element against rotation with respect to the cap and casing.

The casing 10 has longitudinally extending, interior guide ribs 25—25 at its open rear end, which are preferably six in number and circumferentially spaced, as shown in Figures 1 and 5, to provide guideways therebetween. The guideways are six in number, there being three guideways 26—26—26 and three guideways 27—27—27, the guideways 26 and 27 being alternated. The ribs 25 are of the cross section shown in Figure 5 and terminate short of the rear end of the casing 10, thereby providing entrance openings 28 which communicate with the guideways 26 and 27. At the extreme rear end thereof, the casing 10 has three circumferentially spaced, inturned stop flanges or lugs 29—29—29 which are in longitudinal alignment with the guideways 26—26—26, each flange spanning the space between the adjacent ribs 25 which form the opposite longitudinal side walls of the corresponding guideway 26. The spaces or openings between the flanges 29—29—29 are in longitudinal alignment with the guideways 27—27—27, thus leaving the open rear ends of these guideways unobstructed.

The cap A is in the form of a cup-shaped member having a cylindrical side wall 30 and a transverse outer end wall 31. At the inner end, the cap A is provided with a laterally outwardly projecting, annular flange 32 and three radially extending arms 33—33—33 projecting from the flange 32. The cap A is telescoped within the rear end of the casing 10 with the arms 33—33—33 thereof engaged in the guideways 27—27—27. The arms 33 slidingly fit within the guideways 27 and hold the cap against rotation with respect to the casing. Each arm 33 has a rearwardly projecting locking lug or flange 34 at its extremity which is of the same width as the arm and is adapted to interlock with the locking element B, as hereinafter pointed out, to hold the cap and locking element against relative rotation with respect to each other.

The retaining or locking element B is in the form of a collar of tubular shape, having a cylindrical side wall 35. The locking element B surrounds the cylindrical portion of the cap A and has the rear end portion of its side wall 35 flush with the rear end of the cap. At its front or inner end, the locking element B has a laterally projecting, annular flange 36 which is cut away at three circumferentially spaced sections, thereby providing three flat edge portions 37—37—37 and three radial arms 38—38—38 alternated with said flat portions. The flange 36 of the locking element B underlies the flange 32 of the cap and the arms 38—38—38 have their outer ends offset, as indicated at 39 in Figure 4. The offset portions 39—39—39 of the arms 38—38—38 are engaged between the arms 33—33—33 of the cap and have their extremities guided in the guideways 26 in overhanging relation to the stop flanges 29 of the casing A. The lugs or flanges 34—34—34 of the arms 33—33—33 of the cap A are accommodated between the arms 38—38—38 of the locking element B and are provided with flat surfaces 40—40—40 adapted to seat against the flat edges 37—37—37 of the flanges 36 of the locking element. As will be seen upon reference to Figures 3, 4, and 5, the lugs or flanges 34 fill the spaces between the outer edge of the flange 36 of the locking element and the interior wall of the casing 10. The offset ends of the arms 38 of the locking element B are proportioned so that they will pass freely in edgewise direction through the entrance openings 28 of the guideways provided by the ribs 25 of the casing.

The inner or rear ends of the springs 22, 23, and 24 of the mechanism bear on the cap A only, the spring 22 engaging the flange 32 and the springs 23 and 24 extending into the opening of the cap and engaging the end wall 31 thereof. The pressure exerted by these springs holds the cap seated on and interlocked with the locking element B. As will be evident, when the parts are in the normal expanded condition of the mechanism shown in the drawings, the spring cap A is held seated on the locking element B by the springs 22, 23, and 24, with the arms 33 engaged within the guideways 27 and also interlocked with the element B to hold the latter against rotation with respect to the cap. Inasmuch as the cap A is restricted to lengthwise movement with respect to the casing 10 and is interlocked with the locking element B, the latter is effectively held against rotation with respect to the casing 10, particularly when the mechanism is in its fully expanded condition, and the offset ends 39 of the arms 38 of the locking element are in registering relation with the lateral entrance openings 28 at the rear ends of the guideways 26. The locking element, when thus locked to the cap A, has the offset ends 39 of the arms 38, as well as the arms, in longitudinal alignment with the guideways 26 and the stop flanges 29 of the casing, thus, the locking element is maintained in position to have the ends of the arms 38 enter the guideways 26, and as the locking element is forced rearwardly of the casing engage the lugs 29 of the casing to positively limit outward movement of the locking element and cap A which bears thereon.

In assembling the mechanism, the wedge 17, the shoes 15, and the three springs 22, 23, and 24 are first placed within the casing 10. The casing 10 is stood on end during the assembling operation, resting on a suitable support, with the friction shell end of the casing engaging the support and the wedge free. While in this position, the cap A is laid on top of the springs, being turned to such a position that the arms 33 register with the guideways 27, and the locking element B is laid on top of the cap, with the ends 39 of the arms 38 overlying the arms 33 of the cap. Pressure is then applied directly to the wall 31 of the cap A independently of the locking element by any suitable means, such as a press, to force the cap inwardly of the casing to a sufficient extent to provide ample clearance between the rear end of the same and the inner sides of the flanges 29 of the casing to permit the offset ends of the arms 38 of the locking element, which has dropped downwardly with the cap, to be passed edgewise therebetween. The locking element is then given a partial turn to register the extremities of the arms 38 with the guideways 26 and the flanges 29 of the casing, the arms 38 passing edgewise through the openings 28 of the guideways. The pressure is then removed from the cap A, permitting the springs 22, 23, and 24 to seat the cap against the locking element B and engage the arms 33 and lugs 34 of the former between the arms 38 of the latter. The cap is thus effectively interlocked with the locking element to thereby prevent accidental rotation of the latter and disengagement of the same from the casing.

The operation of the improved mechanism shown in Figures 1 to 5 inclusive is as follows: As the mechanism is compressed between the followers of the draft rigging, the spring cap A and its locking element B are first forced inwardly against the resistance of the springs 22, 23, and 24, producing light preliminary action of the mechanism, the friction between the friction shoes and casing being sufficiently great during this action to hold the friction clutch against movement inwardly of the casing. Upon the rear follower of the draft rigging coming into engagement with the rear end of the casing, further compression of the mechanism forces the wedge inwardly of the casing, compressing the springs, spreading the shoes apart, and sliding the latter inwardly of the casing against the spring resistance of the spring means, thereby providing high shock absorbing capacity. In release, the springs 22, 23, and 24 force the wedge block 17, shoes 15, and spring cap A, together with the locking element B, outwardly, thereby restoring the parts to their normal position, outward movement of the wedge being limited by shouldered engagement with the flange 13 of the casing and outward movement of the spring cap being limited by the locking element which engages the flanges 29 of the casing. In this connection it is pointed out that, inasmuch as the collarlike locking element has its outer end flush with the outer end of the spring cap, both the locking element and cap are at all times in contact with the rear follower of the draft rigging and the locking element and cap are compelled to move inwardly and outwardly in unison, thus maintaining the same interlocked against relative rotation throughout both the compression and release strokes of the mechanism, as well as in the full release position of the parts of the mechanism.

Although the cap locks the locking element against rotation at all times, the guideways 26 and the arms 38 of the locking element provide additional independent means for holding the locking element against rotation, which means is operative at all times except when the ends 39 of the arms 38 reach their position of transverse alignment with the entrance openings 28 of the guideways.

Referring next to the embodiment of the invention shown in Figures 6 and 7, the construction is the same as that illustrated in Figures 1 to 5 inclusive with the exception that the spring cap, which is indicated by C, and the locking element, which is indicated by D, are of somewhat different design. In Figures 6 and 7, the casing, the rear end portion of which only is shown, is indicated by 110. The casing 110 is similar to the casing 10 hereinbefore described, having a friction shell section at the front end with which a friction clutch, comprising a wedge and friction shoes, identical with the wedge 17 and the shoes 15 hereinbefore described, cooperates. The spring resistance employed in the embodiment of the invention shown in Figures 6 and 7 also comprises three springs 122, 123, and 124 disposed within the casing, which springs are identical with the springs 22, 23, and 24 hereinbefore described.

The spring cap C is in the form of a cup-shaped member having a cylindrical side wall 130, a transverse outer end wall 131, and an annular flange 132 at its inner end. The flange 132 is provided with three radially extending lugs 133, which are engaged in lengthwise extending, interior guideways 127 of the casing 110. The guideways 127 are three in number and are alternated with three additional guideways 126. The guideways 126 and 127 are formed by lengthwise extending, interior ribs 125 on the casing, six such ribs being employed. The lugs 133 of the cap C are of greater thickness than the flange 132, as clearly shown in Figure 6, and extend rearwardly of said flane.

The locking element D is in the form of a cylindrical collar surrounding the cap C, having an inturned, annular flange 141 at its rear end, which surrounds the rear extremity of the cap, and three radially projecting arms 142—142—142 at its inner end which engage in the guideways 126. Between the arms 142—142—142, the side wall of the collar is cut out, or notched, to form seats 143—143—143 which receive the lugs 133—133—133 of the cap C to lock the locking element to the cap.

The casing 110 is provided with three inturned, circumferentially spaced stop flanges 144—144—144 at its rear end which overhang the rear ends of the guideways 126—126—126 and form stop shoulders engageable by the forms 142—142—142 of the locking element D to limit outward movement of the latter. The guide ribs 125, which form the side walls of the guideways 126, terminate short of the flanges 144, thus providing entrance openings 145 through which the arms 142 of the locking element may be entered in edgewise direction to align the same with the flanges 144—144—144 and guideways 126—126—126.

The mechanism shown in Figures 6 and 7 is assembled in the same manner as is the mechanism hereinbefore described in connection with Figures 1 to 5 inclusive, the cap C being placed within the casing 110 and moved inwardly to clear the entrance openings 145 to permit the locking element D to be applied by entering the ends of the arms 142—142—142 in edgewise direction through the openings 145—145—145 of the guideways 126—126—126. When the parts have been completely assembled, the springs 122, 123, and 124 maintain the cap in seated condition on the locking element D with the lugs 133 engaged in the seats 143, holding the locking element against rotation.

I claim:

1. In a friction shock absorbing mechanism, the combination with a friction casing open at its front and rear ends, said casing having interior, circumferentially spaced stop flanges at its rear end; of a friction clutch slidingly telescoped within the front end of the casing and having sliding frictional engagement therewith; lengthwise extending, interior guideways on said casing at the rear end thereof, said guideways being aligned with the spaces between said stop flanges and being open and unobstructed at their rear ends; a spring cap slidingly telescoped within the rear end of the casing; a locking element on which said cap bears; stop lugs on said element longitudinally aligned with the stop flanges and engageable therewith to limit outward movement of said element; radially extending guide arms on the cap guided for sliding movement in said guideways; seats in said locking element receiving said arms to lock the locking element against rotation with respect to the cap; and spring means within the casing bearing on said cap and holding the same seated on said locking element with the arms of said cap engaged in said seats.

2. In a friction shock absorbing mechanism, the combination with a friction casing open at its rear end, said casing having circumferentially spaced, lengthwise extending guideways at its rear end, said guideways being open and unobstructed at the rear end of the casing; of inturned stop flanges at the rear end of the casing in longitudinal alignment with the openings between adjacent guideways; a spring cap slidingly telescoped within the rear end of the casing, said cap having radially extending arms slidingly engaged in said guideways; a locking element on which said cap bears; radial stop projections on said locking element engageable with the stop flanges of the casing to limit outward movement of said element; seats on said element accommodating the arms of said cap; and spring means within the casing yieldingly opposing inward movement of said cap and holding the same seated on said locking element with the arms of said cap engaged in said seats.

3. In a friction shock absorbing mechanism, the combination with a friction casing open at its rear end; of a cup-shaped spring cap slidingly telescoped within the rear end of the casing, said cap being closed at its outer end and having a peripheral flange at its inner end provided with radial guide arms; interior, lengthwise extending, circumferentially spaced guideways on said casing in which said arms of said cap are slidingly engaged, said guideways being open and unobstructed at the rear end of the casing; a sliding locking collar in said casing surrounding the cap on the inner end of which said cap bears, the outer end of said collar being flush with the outer end of the cap; interengaging lugs and seats on said cap and locking element for holding said cap and element against relative rotation; circumferentially spaced stop flanges on said casing in longitudinal alignment with the spaces between the guideways; radial stop lugs at the inner end of said locking element in alignment with said stop flanges and engageable thereby to limit outward movement of the locking element; and spring means within the casing bearing on the peripheral flange of said cap and yieldingly pressing said cap against the locking element with the lugs and seats of the cap and locking element interlocked.

4. In a friction shock absorbing mechanism, the combination with a friction casing open at its rear end, said casing having longitudinally extending, circumferentially spaced, interior guide ribs at said rear end providing lengthwise extending, adjacent guideways; of inturned, circumferentially spaced stop flanges at the rear end of said casing, said stop flanges being in lengthwise alignment with alternate guideways; a locking element slidingly telescoped within the rear end of the casing and having guide projections slidingly engaged in said last named guideways and in alignment with said stop flanges to limit outward movement of said locking element by engagement with said flanges; a spring cap slidingly telescoped within the rear end of the casing and having guide arms engaged with the remaining guideways to limit said cap to movement lengthwise of the casing, said last named guideways opening through the rear end of the casing, said locking element having shouldered engagement with the cap to limit outward movement of the cap; cooperating locking means on said cap and element for locking the same against relative rotation; and spring means within the casing bearing on said cap and yieldingly opposing inward movement thereof.

STACY B. HASELTINE.

REFERENCES CITED

The following references are of record in the file of this patent:

UNITED STATES PATENTS

| Number | Name | Date |
| --- | --- | --- |
| 2,421,075 | Lehman | May 27, 1947 |
| 2,426,262 | Dath | Aug. 26, 1947 |
| 2,436,917 | Dath | Mar. 2, 1948 |